Feb. 24, 1931. R. E. MANLEY 1,793,863
TIRE CHANGER
Filed Dec. 30, 1924 2 Sheets-Sheet 2
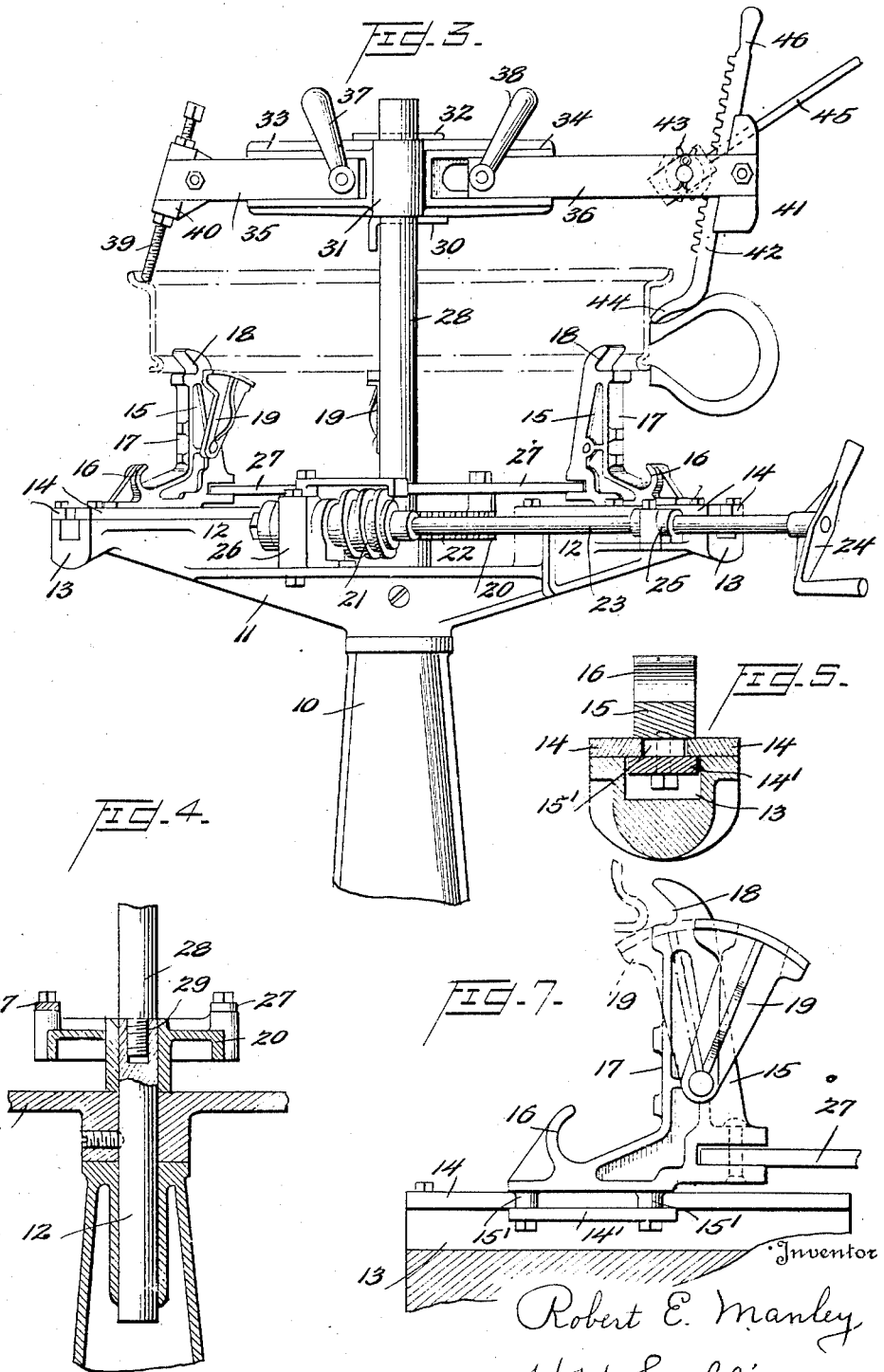

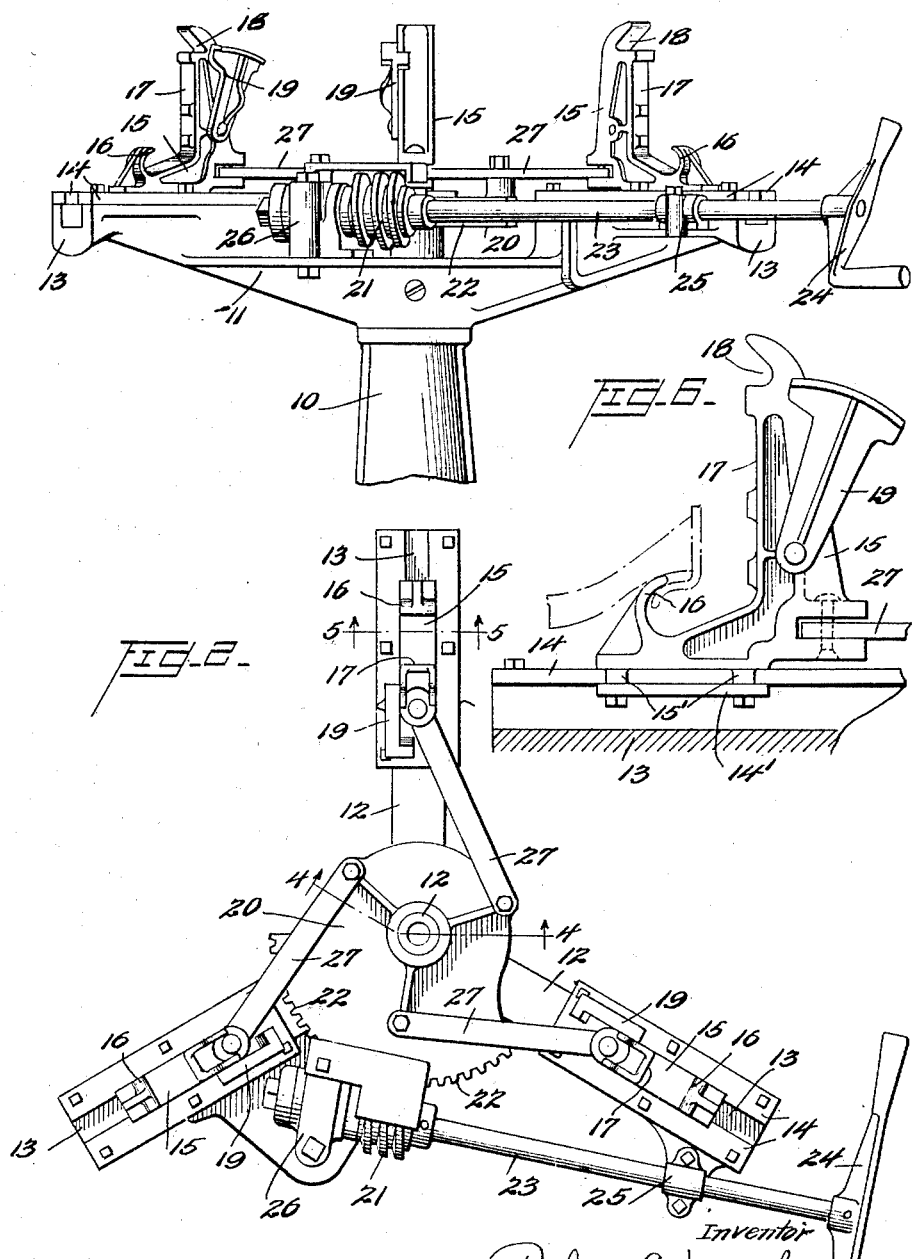

Patented Feb. 24, 1931

1,793,863

UNITED STATES PATENT OFFICE

ROBERT E. MANLEY, OF YORK, PENNSYLVANIA, ASSIGNOR TO MANLEY MANUFACTURING COMPANY, OF YORK, PENNSYLVANIA, A CORPORATION OF DELAWARE

TIRE CHANGER

Application filed December 30, 1924. Serial No. 758,900.

This invention relates to a tire changing mechanism and more particularly to such a mechanism in which provision is made for the removal of casings from rims of both the split and solid types, and has for its object the improvement generally of such devices.

A further object of the invention is the provision in a single tool of mechanism for removing a casing from a solid rim and mechanism for contracting and expanding a split rim, elements of one of such mechanisms being employed in the functioning of the other. A further object of the invention is the provision of an efficient rack and pinion press for loosening and removing casings from solid rims. A still further object is the provision in a device of this kind of improved details of construction of radially movable jaws actuated by a worm and worm gear mechanism.

Other objects and advantages of the invention will hereinafter appear in the following description and the novel features thereof will be particularly pointed out in the claims.

In the drawings:

Figure 1 is an elevation of that portion of the tire changer employed in contracting and expanding split rims.

Figure 2 is a plan of this portion;

Figure 3 is an elevation showing the rack and pinion press for use in removing casings from solid rims;

Figure 4 is a section taken on the line 4—4 of Figure 2;

Figure 5 is a section on the line 5—5 of Figure 2;

Figure 6 is an elevation of one of the sliding jaws; and

Figure 7 is a similar view showing the use of the jaw in removing casings from solid rims.

The tire changing apparatus is supported upon any suitable pedestal 10, and is carried by a three-armed spider 11 mounted to revolve upon the upper end of the pedestal in any manner, for instance, by the provision of a stub shaft 12 held by set screws to the spider, as shown in Figure 4, and which projects down into the pedestal a sufficient distance to insure a proper bearing. The upper end of the pedestal and the contacting portion of the spider are machined to permit the spider to revolve freely upon the pedestal.

The spider is provided with three arms 13 of similar construction, each having the form of a channel, upon the upper surface of which are mounted steel guides 14, between which are slidably mounted jaws 15. The jaws are provided with a pair of lugs 15' depending from the base thereof, which lugs have secured thereto the steel plate 14'. The steel guides 14 and plate 14' provide a mounting for the jaws which may be readily adjusted to compensate for wear upon the parts. It will also be appreciated that by this mounting any jaws may be easily removed from the tire changer by removal of the appropriate cap screw connecting the link 27 to the gear 20. The connection between the link 27 and the jaw is preferably formed by a simple rivet.

The jaws are formed with inwardly projecting hooks 16 at their outer ends, which are designed to engage the edges of split rims. The back of the jaw, designated by the numeral 17, is intended to press against the flat portion of the rim in the act of expanding a rim. At the upper end of the jaw back is provided a notch 18, designed to receive the beaded edge of a solid rim, and pivoted to the back is a supporting plate 19 adapted to be swung to a position under the notch 18 to form a temporary support for a solid rim.

Mounted centrally upon the spider 11 is a worm gear 20, which is driven by means of the worm 21 meshing with the teeth 22 on the gear. The worm 21 is secured in any suitable manner to the shaft 23, which is rotated by the crank 24 and mounted in suitable bearings 25 and 26. The bearing 25 is provided on one of the arms of the spider, while bearing 26 is a double roller bearing mounted upon the spider proper in any suitable manner, and constitutes a double thrust bearing to take up the thrust of the worm in the operation of the mechanism. The radially movable arms are connected to the gear 20 by links 27.

In the operation of the mechanism just described upon split rims, the rim and casing is laid upon the tire changer in such a manner that the hooks 16 engage the outwardly projecting flange on the rim, as apparent from Figure 6 of the drawing. The crank 24 is turned to cause the worm 21 to drive the gear 20. This movement is imparted to the jaws through the links 27. It will be appreciated that this mechanism exerts a powerful pull upon the jaws to contract the rim.

When it is desired to replace the casing upon the rim after the tire repair has been effected, it is only necessary to lay the casing over the contracted rim, and turn the crank in the reverse direction to that employed in contracting the rim. After the rim has expanded to grip the casing, a further movement of the crank 24 in the same direction will cause the back 17 of the jaw to engage the rim and further expand the rim to cause the joint to be made. The rim is then removed upon a slight turning of the crank in the opposite direction.

In order to equip the tire changer with means for changing a solid rim, such as used on wire and some disk wheels, I have provided a solid steel post 28 to be screwed into the socket 29 formed in the upper end of shaft 12. Upon this steel post, the hubs of wire or disk wheels may be placed and allowed to rest upon the projected plates 19.

A pin 30 is passed through the post, on which rests a tool carrier 31. Above the carrier is a pin 32, the two pins constituting limiting means for the vertical movement of the carrier on the post. The carrier comprises two arms 33 and 34, upon which are mounted, between suitable ribs, horizontal supporting brackets 35 and 36 in an adjustable manner. 37 and 38 indicate clamps to hold the supporting brackets in any adjusted position conforming to the demands of different sizes of rims. The bracket 35 carries at its end a set screw 39, adjustable in its holder 40, the holder itself being clamped securely at the end of the bracket 35. The set screw is designed to bear upon the rim flange and hold the same against tilting while the casing is being pressed off by the rack and pinion presser carried by the companion bracket 36.

The rack and pinion presser, designed for loosening and pressing off the casing, comprises a holder 41 mounted at the end of the bracket 36, against the inner face of which is mounted a rack 42, which is held against the holder 41 by means of the pinion 43. At the lower end of the rack is a toe 44 offset at about 60° to engage the rim behind the flange thereof. It will be appreciated that this toe, when pressed downward, will exert a pressure against the casing which will cause it to be pressed off the rim. It is desirable in order to prevent buckling of the casing to have the toe 44 in the manipulation of the presser in contact with the rim. This is permitted by the looseness of fit between the parts and the particular angle of mounting of the rack that is, about 70° to horizontal with respect to the toe as well as the shape of the toe itself. There is provided at the opposite end of the rack an offset handhold 46, by means of which the toe may be maintained in contact with the back of the rim in the manipulation of the presser. To manipulate the rack there is provided a handle 45, by means of which the pinion 43 can be rotated through the medium of a sleeve securely fastened to the projecting end of the pinion shaft.

Having described the invention, what is claimed as new is:

1. In a tire changer, the combination of a support, a spider revolubly mounted thereon, rim-engaging jaws on said spider adapted to be moved radially to grip different sizes of rims, plates mounted on the jaws and adapted to be projected forwardly to form temporary supports for a rim, a standard, a carrier mounted upon the standard, and a holding pin and a presser toe carried by said carrier.

2. In a tire changer, the combination of mechanism comprising a plurality of radially movable jaws, said jaws being provided with notches in their upper ends for the reception of the beaded edge of a solid rim, projecting supporting elements carried by said jaws, and mechanism for loosening and removing casings from solid rims while the rims are supported in said notches.

3. In a tire changer, the combination with a support for holding a tire rim of the solid type in a horizontal position, of a standard, a carrier bar supported thereon having at one end a presser foot vertically movable with respect to the carrier bar and adapted to be pressed under the upper edge of the rim and against the body thereof to loosen and remove a casing, said bar having at its other end angularly disposed adjustable means to engage the rim diametrically from the presser foot to steady the rim during the operation of the presser foot.

4. In a tire changer, the combination with a support for a tire rim of the solid type, a tool carrier mounted above said support and having at one end an adjustable rim holding element and at its opposite end a presser foot adjustably supported and adapted to be moved without respect to the carrier and into contact with the flange and body of the rim to loosen and remove the casing therefrom.

5. In a tire changer, the combination with a support for a tire rim of the solid type comprising a vertical standard, a tool carrier mounted on the standard and having at one end means for holding the rim against vertical movement and at the opposite end a presser foot for stripping a casing from the rim, said presser foot being loosely mounted inclined from the vertical whereby in its downward movement it may manually be maintained in contact with the rim flange and body.

6. A tool for removing casings from solid rims comprising means for holding a rim, a presser foot loosely mounted above the rim and having its lower end provided with a toe adapted to be maintained, when desired, in contact with the rim flange and the rim body, means for forcing said presser foot downwardly and a handhold at the upper end of said presser foot to tilt the presser foot to move the toe toward or away from the rim as desired.

7. In a tire changer comprising a plurality of radially movable jaws, each jaw being provided at its upper end with a notch, and a projecting element adapted to be moved into position under the notch temporarily to support a tire rim.

8. In a tire changer, a vertical standard, a member pivotally mounted on said standard, a plurality of arms each slidably mounted in said member, an adjustable stop member at the end of one of said arms adapted to engage a rim, and a presser member at the free end of the other arm to press a tire from said rim.

9. In a tire changer, a plurality of rim engaging jaws each having a notch therein adapted to receive and support a rim with a tire casing thereon, means for moving one of said jaws with respect to the other two, a bar pivoted about a vertical axis substantially concentric with respect to said jaws, vertically adjustable means carried by said bar for engaging the top of the rim held in said jaws, and means to engage the tire casing at a point diametrically opposite to the bar carried means to press the tire casing from the rim, said casing engaging means having vertical movement relatively to the bar.

10. The device of claim 8 in which the standard is vertical, the two arms are alined and on opposite sides of the standard and in which the presser member is inclined with respect to the axis of the standard.

11. A presser arm for a tire changer consisting of a straight body member having rack teeth on one side thereof, a handle at one end of the rack and a presser foot at the other end of the rack.

12. The device of claim 11 in which the presser foot is extended laterally from the straight rack bar portion at an angle of approximately 60° and the handle portion is extended slightly in an opposite lateral direction.

13. In a tire changer, a pedestal, a pair of detachable alined posts rotatably mounted in said pedestal, one of said posts being entirely above the pedestal, rim holding means on one of said posts and tire removing means carried by the other of said posts.

14. In combination, a pedestal, a support thereon, three radially movable jaws to grip a tire rim, a post rising centrally of the pedestal, a horizontal bracket on the post, means at the free end of the post for removing a casing from a rim held in the jaws, said means including a sliding member operated by a lever extending beyond the periphery of the rim.

15. In a tire changer, a pedestal, a spider rotatable thereon, means carried by the spider for fixedly holding a rim with a casing fast thereto, a post insertable into position when the rim is held, an arm rotatable about the post and lever operated means extending in part beyond the rim for forcing the casing from the rim.

16. In a tire changer, a pedestal, a support resting upon the pedestal, a post extending freely into the pedestal to pivot the support, rim holding means on the support and rotatable about the axis of the post, and a vertically movable presser mounted to swing about the axis of the rim to press from the rim a casing fast thereto, said rim holding means and said presser being independently movable about the axis of the post.

17. The device of claim 16 in which means rotatable about the post are provided to move the rim holding means radially of the rim axis, and the post is in two detachable sections, the upper section providing pivotal support for the presser, said upper section being removable by hand so that it is not necessary to lift the rim and/or casing over the post and/or presser.

In testimony whereof I affix my signature.
ROBERT E. MANLEY.